United States Patent [19]

Kress

[11] 3,722,874
[45] Mar. 27, 1973

[54] SLAG POT CARRIER

[76] Inventor: Edward S. Kress, 4009 Brookdale Place, Peoria, Ill. 61614

[22] Filed: Dec. 15, 1970

[21] Appl. No.: 98,306

[52] U.S. Cl. .............................................. 267/64 R
[51] Int. Cl. ............................................... F16l 5/00
[58] Field of Search ............ 267/64 R, 64 S, 64 A, 65

[56] References Cited

UNITED STATES PATENTS

| | | | |
|---|---|---|---|
| 3,365,191 | 1/1968 | Ellis, Jr. et al. | 267/64 R |
| 3,330,429 | 7/1967 | Kress | 214/314 |

*Primary Examiner*—James B. Marbert
*Attorney*—Wolfe, Hubbard, Leydig, Voit & Osann, Ltd.

[57] ABSTRACT

An improved slag pot load carrier is provided. Fluid powered means are included to assist the primary dump mechanism in moving a vehicle load pivoted on the main vehicle frame from a carry to a dump position, and to return the load to its carry position. Suspension means are provided to lower and raise at least a portion of the vehicle frame and to resiliently support the frame against shocks. A hydro-pneumatic system is also provided to appropriately actuate the suspension means, and the primary dump and return assist mechanisms.

2 Claims, 17 Drawing Figures

Patented March 27, 1973　3,722,874

Patented March 27, 1973

INVENTOR.
EDWARD S. KRESS
BY Wolfe, Hubbard, Lydig, Voit & Osann
ATTORNEYS.

INVENTOR.
EDWARD S. KRESS
BY Wolfe, Hubbard, Leydig, Voit & Osann
ATTORNEYS.

INVENTOR.
EDWARD S. KRESS
BY
Wolfe, Hubbard, Leydig, Voit & Osann
ATTORNEYS.

Patented March 27, 1973 3,722,874

SLAG POT CARRIER

This invention relates generally to mechanisms for transporting and manipulating heavy loads and more particularly concerns improvements in transporter vehicles for lifting, supporting, carrying and dumping heavy loads. This transporter vehicle may be of the general type disclosed in U.S. Pat. No. 3,330,429.

For purposes of illustration, there is shown a vehicle fork carrying a load comprising a ladle or pot of the kind used in the steel making industry. The slag pot may weigh more than 200 tons and may be filled with molten slag and steel from a steel furnace. A large and heavy container filled with a great quantity of molten material of this type is difficult to handle.

It is the general aim of this invention to provide an improved vehicle having facilities for handling a load such as a slag pot or any bulk heavy material container. It is a related object to provide an improved fluid power system for such a carrier vehicle which will allow the vehicle to easily pick up, carry, dump, return and disengage its load.

It is another object of the invention to provide a slag pot dump and return assist system for assisting a powered main dump system in tilting the heavy vehicle load from a carry to a dump position, and in returning the load from the dump to the carry position.

It is an associated object to provide a dump or return assist system to assist the main dump cylinders of a transporter in rotating a load such as a slag pot to and from a dump position when the main cylinders and load are located in relative positions such that the load cannot be easily rotated by the main dump cylinders alone.

It is another object of the invention to provide a vehicle suspension system which will allow at least part of the vehicle to be lowered to engage a load resting on the ground, and then to be raised to bring the load into a carry position.

It is an associated object to provide a vehicle suspension system for supporting and smoothly carrying the vehicle load. It is a related object to provide a suspension system for carrying heavy loads such as slag pots and the like which will allow sufficient play or movement within the suspension system to avoid severe shocks being transmitted to and from the vehicle and load by the vehicle wheels and yet which will avoid excessive bounce or travel within the system.

It is another object of the invention to provide a vehicle suspension unit which will produce a smooth vehicle ride and a low rate of bounce or low spring rate.

Other objects and advantages of the invention will become apparent upon reading the following detailed description and upon reference to the drawings in which:

FIG. 2 is an overall plan view of the vehicle;

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning first to FIGS. 1–4, there is shown a typical rubber-tired carrier vehicle 20 upon which an embodiment of the invention may be installed. The vehicle 20 includes a drive unit 21 having two driving wheels 22 and an operator's cab 23. Connected to the drive unit 21 is a trailer unit 24 which is pivoted about a vertical axis connection 25.

The vehicle 20 includes, in its trailer portion 24, a goose neck 26 and a rigid, generally U-shaped frame 27, the frame 27 being defined by a cross beam 28 and a pair of rearwardly extending arms 29 which generally embrace the vehicle load. In the illustrated vehicle, the load may be considered to be a large slag furnace pot P. This pot P may be filled with molten slag from a slag furnace and may weigh on the order of 200 tons. The pot P is selectively engaged and secured to the trailer 24 by a pot engaging hook mechanism 31.

Ground engaging trailer wheel sets 33 are mounted at each side of the trainer 24. Each wheel set 33 is mounted on an axle 35 which is secured to the trailing end of a wheel support arm 36. The forward end of the support arm 36 carries a pin 37 which is slidably fitted into a collar 38 pivoted upon a horizontal axis between lugs 39 extending downwardly from the frame arms 27. The pivoting and sliding fit between the pin 37 and the collar 38 provides the required swinging and sliding connection between the wheel support arm 36 and the frame arm 29.

In the illustrated vehicle, the pot P is surrounded by a cradle frame 41 for carrying the pot P upon the engaging hook mechanism 31. To allow rotation of the cradle frame 41 and pot P from a carry position P-1 to a dump position P-4 (shown in phanton lines FIG. 1), the cradle frame 41 is pivoted upon the trailer frame 27 by pivot connections 43 provided between the cradle frame 41 and the trailer arms 29. It will be understood that while a slag pot is illustrated as the vehicle load, the vehicle and invention can be used in association with a number of different containers and loads.

For rotating the slag pot P from its carry position P-4 to its dump position P-4, primary or main power means here illustrated as fluid power cylinders 45 are provided. The illustrated cylinders 45 are journaled upon the trailer arms 29 by means of collars 46; piston rods 47 of the cylinders 45 are pivotally connected to the cradle frame 41 at pin connections 48, as may be particularly seen in FIGS. 5-9.

Owing to the location of the cylinders 45 relative to the pot P and the pivot connections 43, the geometry of the movements of these parts may make it difficult for the cylinders 45 to move the pot P into all of the positions required in rotating the pot P from a carry position P-1 through an arc to a dump position P-4 and returning the pot to its carry position P-1. More specifically, it will be noted that in the embodiment illustrated, the force exerted by the primary cylinders 45 acts to rotate the pot P through a relatively short lever arm when the pot is in a carry position P-1 or a dump position P-4. In accordance with one aspect of the invention, therefore, assist means are provided to assist in rotating the pot P from its carry position P-1 to its dump position P-4.

In the illustrated embodiment of the invention, assist means includes a assist power means 50, and flexible, tensible link means, here illustrated as a cable 51 connected at one point 52 to the assist power means 50 and at the other point 53 to the dump body or tilt frame 41. To provide additional leverage and additional bearing of the cable 51 on the tilt frame 41, cable reaction structures or extensions 54 are provided. These extensions 54 fixedly depend from the tilt frame 41 for engagement with the cable 51 when the pot P is located in the carry position, and shorten the effected length of the cable engaged.

To assist in lifting the pot through its vertical arc of rotation from the carry position P-1 to the dump position P-4, in the illustrated embodiment of the invention, the cable 51 is connected to the assist power mechanism 50 at a point located above the pivot 43 of the pot P. The second connection point 53 is located on the dump body frame 41 at a spot between the pot pivot point 43 and the assist power means 50. It will be understood that other connection locations may be used without departing from the scope of the invention, but the described arrangement is simple yet effective.

Figure 10:
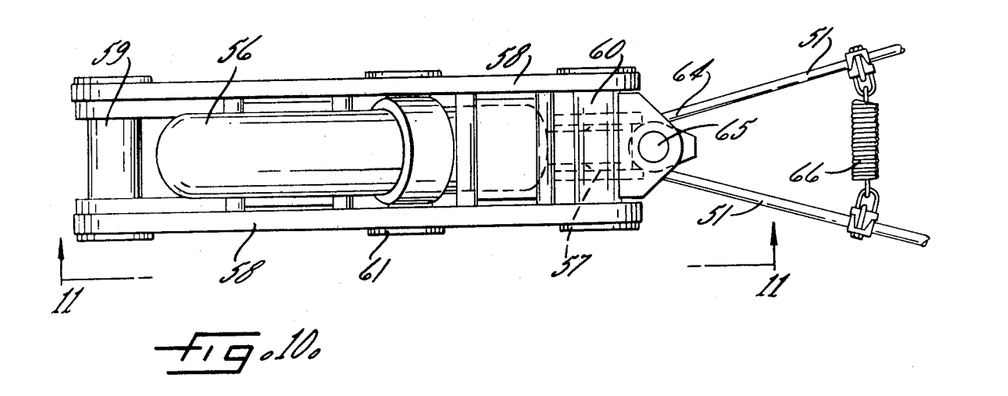
FIG. 10 is a fragmentary plan view showing the power cylinder and associated assist system apparatus.
Figure 11:
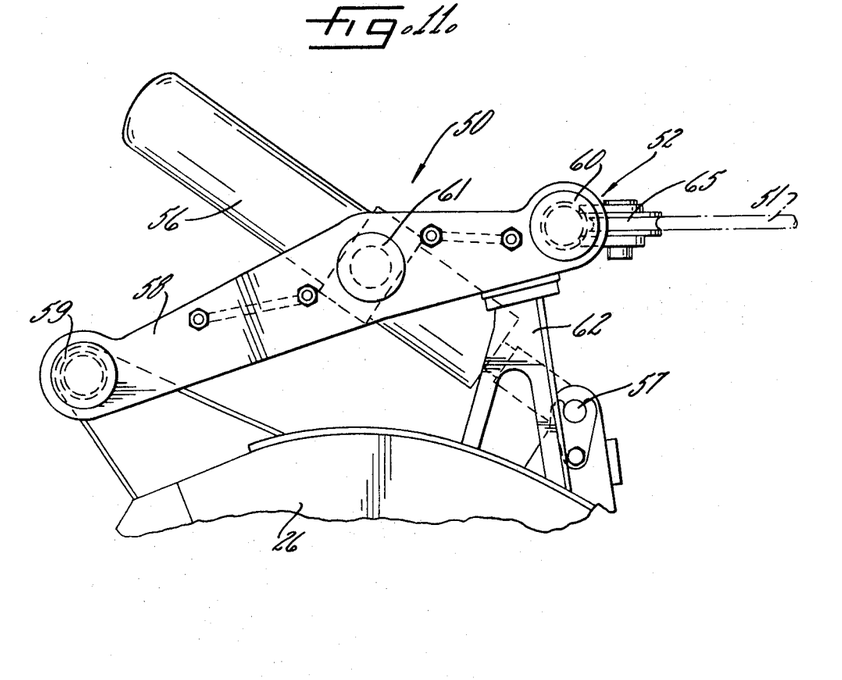
FIG. 11 is a fragmentary elevational view showing the assist system power cylinder and associated apparatus illustrated in FIG. 10.

It is a feature of the invention that the requisite lifting and withdrawing motion of the first connection point 52 of the cable 51 is provided by the assist power means 50 illustrated in FIGS. 10, 11 and elsewhere. The assist power means 50 includes a fluid power cylinder 56 pivotally attached near its cylinder rod end 57 to the goose neck 26. A lifting lever 58, also pivotally attached to the goose neck 26 at a journal 59, is attached at its opposite end 60 to the first connection point 52 of the cable 51. To provide the appropriate swinging arc of travel for the end of 60 of the lifting lever 58, the fluid power cylinder 56 is attached to the lever 58 at a point 61 intermediate the ends 59 and 60 of the lever 58. A stop mount 62 is provided to limit the downward rotation of the lever 58 and to avoid jamming the mechanism by accidentally substantially aligning the thrust axis of the cylinder 56 with the chord of the lever 58.

Figure 12:
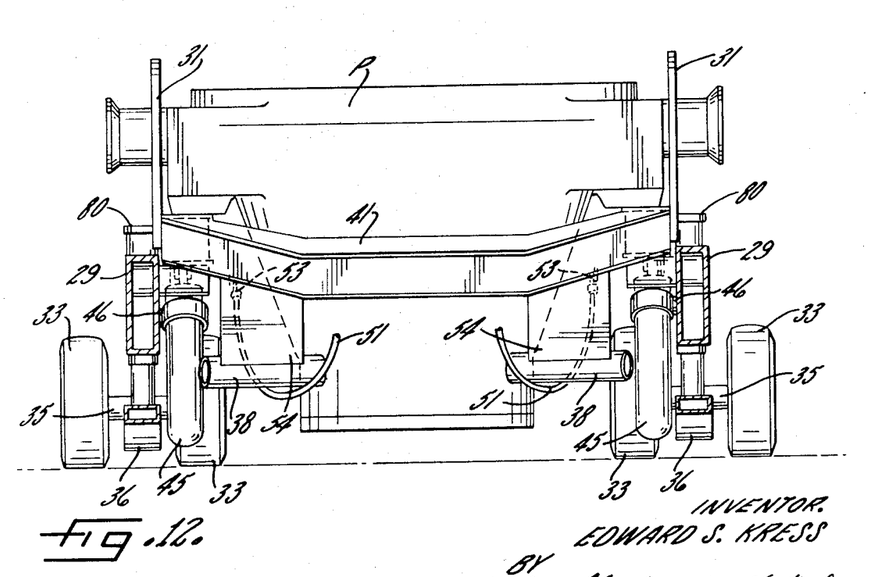
FIG. 12 is a sectional view taken substantially along the plane of line 12—12 in FIG. 1 showing in further detail the cables, dump body standards, and other parts of the vehicle.

As may be seen in FIGS. 10, 12 and elsewhere, the tensible link means includes a single cable attached, at each of its ends, to the cradle frame 41 and having a mid-portion 64 passing through a pulley attachment 65 connected to the free end 60 of the lever 58. Such arrangement allows, in further accordance with the invention, automatic equalization of the tension upon the cable spans as the load is lifted. Such equalization of tension, in turn, produces equal lengths of cable engaged with the pot between the connection points 52 and 53, thereby eliminating any tendency to misalign the assist lifting means and to accidentally lift one side of the pot higher or more rapidly than the opposite side.

Another function of the cable 51 is to limit the rotation of the pot P as it may be tilted past its fully dumped position P-4, normally defined by a dumping pad, thereby protecting the primary dump cylinder 45 from overextension and consequent damage. To protect, in turn, the cable 51, a biasing means such as a spring 66 acts as a snubbing device to gradually tension the cable 51 when the pot P is moved into such over-tilted position.

Operation of the vehicle dump mechanism may now be easily envisioned from the above description, and from particular reference to FIGS. 5-9. When it is desired to rotate the pot P from its carry position P-1 to its dump position P-4, the operator actuates appropriate hydraulic circuitry for the extension of the piston rods 47 in the primary lift cylinders 56. As the assist power cylinder 56 is extended, the end 60 of the rotating lever 58 is moved through an upward and outward arc, thereby drawing the cable 51 generally upwardly. Such motion of the cable 51 urges the extensions 54, tilt frame 41, and pot P to rotate about the pivot point 43, thereby rotating the pot into a preliminarily rotated position P-2.

Before the pot reaches a top dead center position P-3, the standards 54 are, as illustrated, disengaged from the cables 51. Continued extension of the main piston rods 47 alone causes, as may be seen in FIG. 8, the pot to rotate to its fully dumped position P-4. Appropriate hydraulic circuitry allows the assist power means 56 to reverse its motion and retract during the described latter portion of the dump cycle, as the pot moves from its top-most position P-3 to its fully dumped position P-4. This retraction allows the lift lever cable end 60 to rotate toward the pot P and permits the pot P to rotate to its fully dumped position P-4 without breaking or stretching the cable 51.

When it is desired to return the pot from its fully dumped position P-4 to its carry position P-1, and the main lift cylinders 45 are actuated so as to retract the main piston rods 47, the assist power means 56 are again actuated in an extending direction. The cable 51 is thereby tensioned, and the tilt frame 41 and carried pot P are pulled toward the carry position. At the top dead center point P-3 in the return cycle, assist power means 56 is once again allowed to retract, thereby allowing subsequent motion of the cable toward the now descending pot P so as to cradle the extensions 54 by the cable 51 and gently lower the pot into its carry position.

Figure 1:
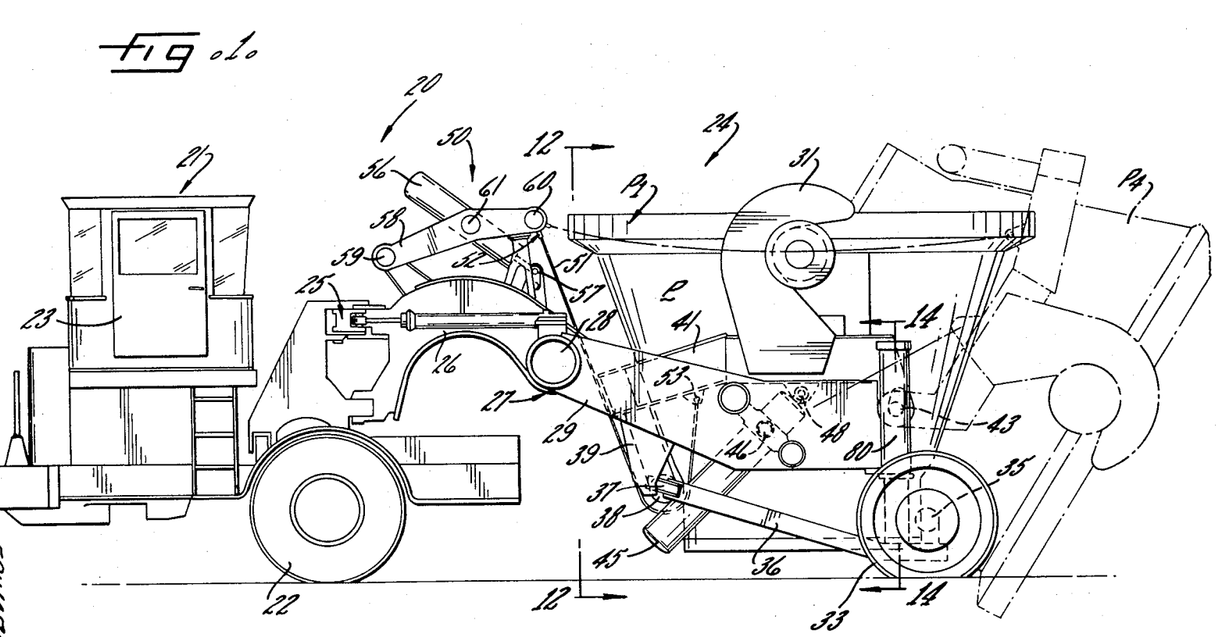
FIG. 1 is an overall side elevational view of a typical vehicle for carrying heavy loads such as slag pots in which an embodiment of the invention is utilized.
Figure 3:
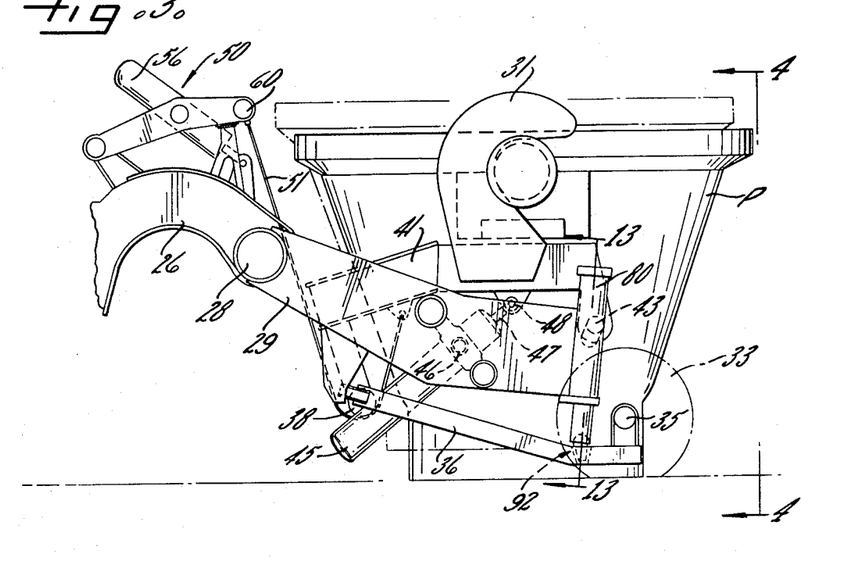
FIG. 3 is a fragmentary side elevational view of the trailer portion shown of the vehicle illustrated in FIGS. 1 and 2 with the associated load or pot resting on ground.
Figure 4:
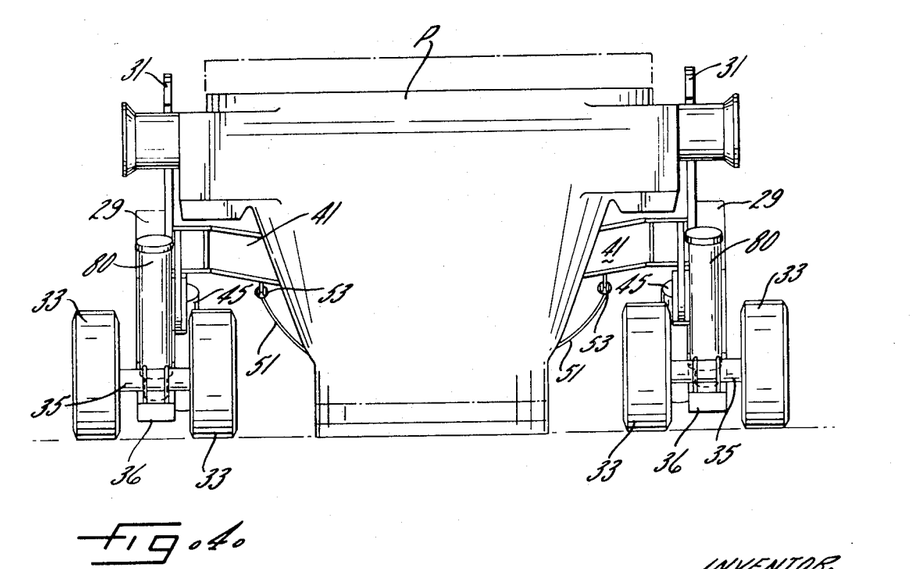
FIG. 4 is an elevational end view taken substantially in the plane of line 4—4 in FIG. 3 showing in further detail the rear of the vehicle trailer and embodiments of the invention.
Figure 5:
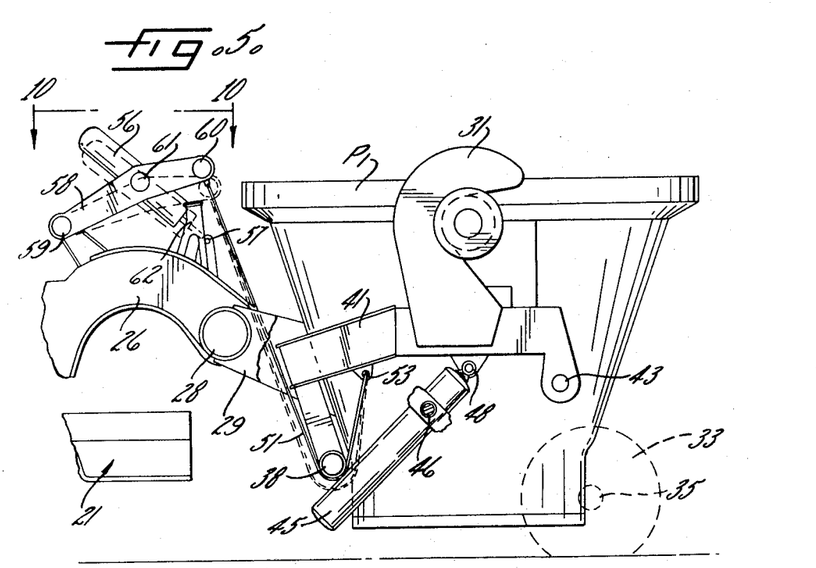
FIG. 5 is a fragmentary view taken substantially in the plane of line 5—5 in FIG. 2 and showing in further detail the dump and return assist system with the cable taunt at the inception of tilt.
Figure 6:
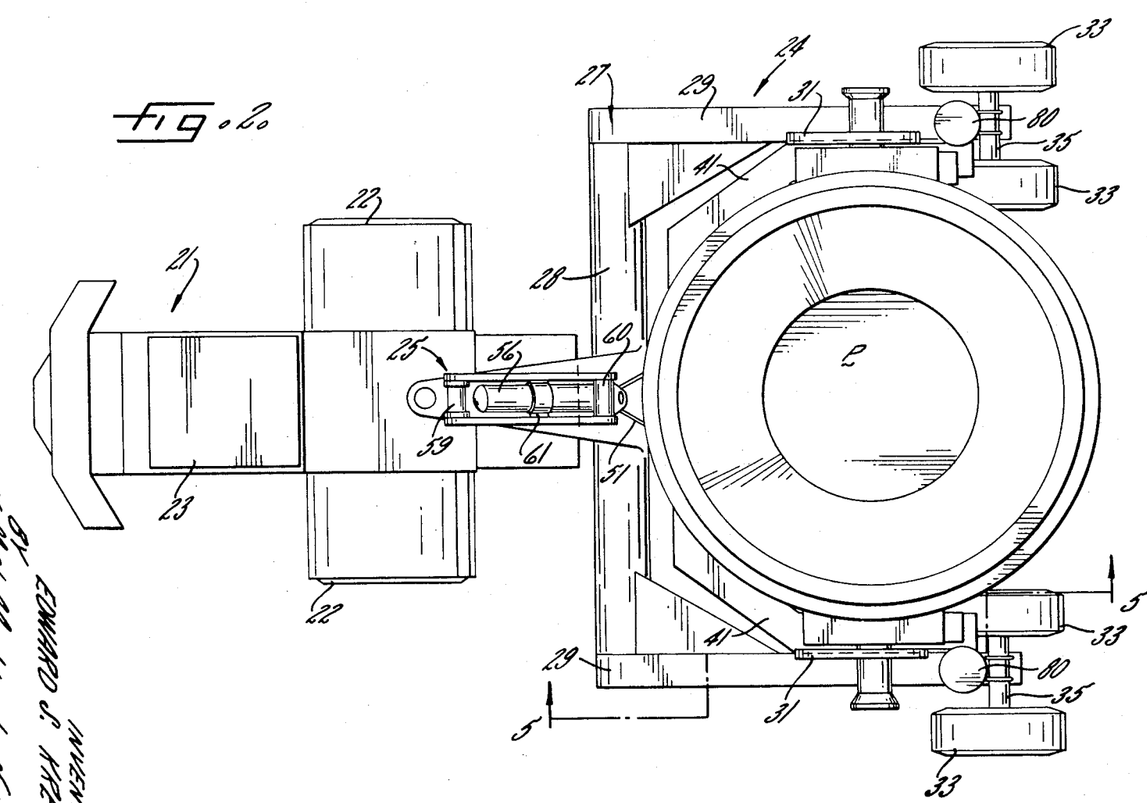
FIG. 6 is a fragmentary sectional view similar to FIG. 5 and taken substantially in the plane of line 5—5 in FIG. 2 but showing the pot near the end of the dump assist position.
Figure 7:
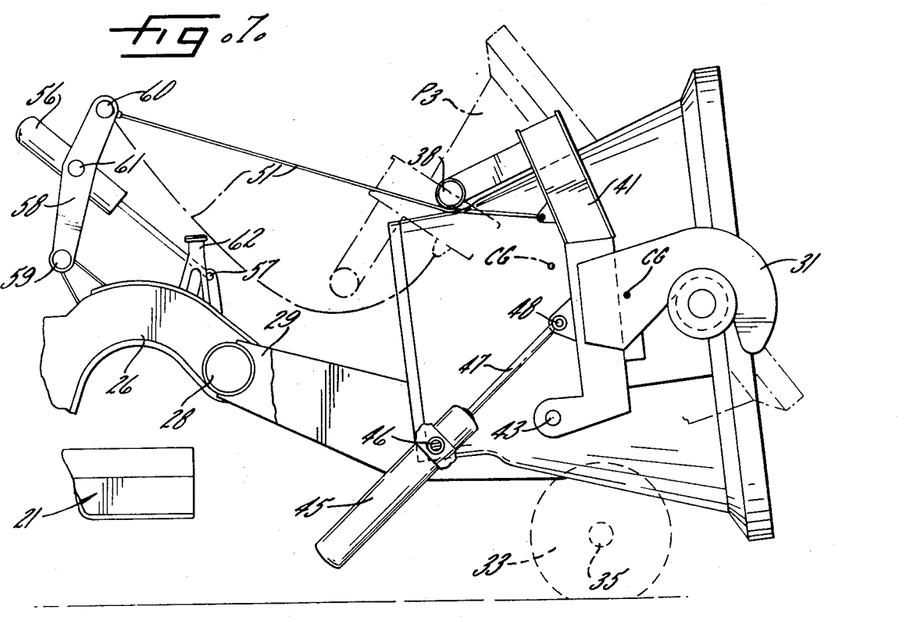
FIG. 7 is a fragmentary sectional view similar to FIGS. 5 and 6, taken substantially in the plane of line 5—5 in FIG. 2 and showing the slag pot load in an inter-midpoint tilt position.
Figure 8:
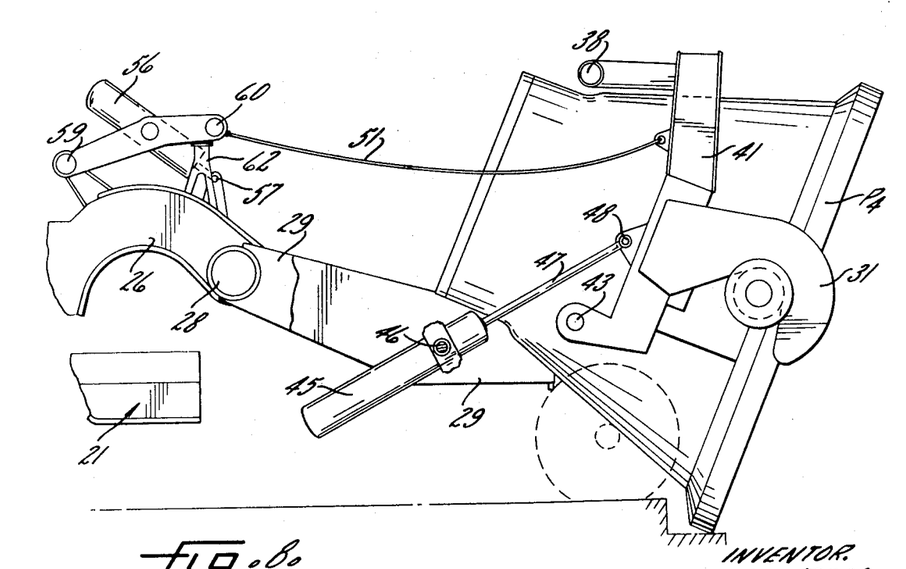
FIG. 8 is a fragmentary sectional view similar to FIGS. 5-7 taken substantially in the plane of line 5—5 in FIG. 2 showing the slag pot load in its dumped position.
Figure 9:
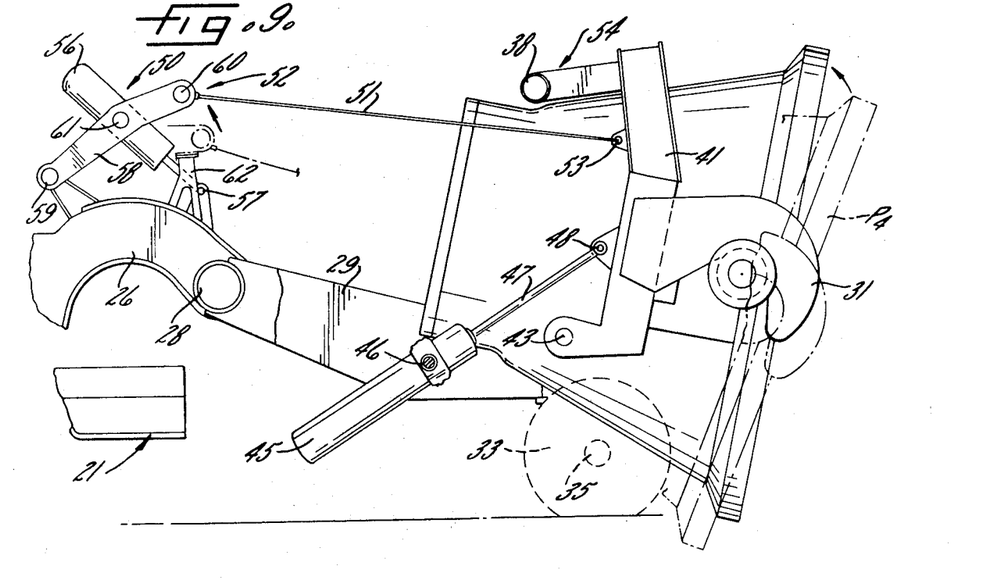
FIG. 9 is a fragmentary sectional view similar to FIGS. 5-8 taken substantially in the plane of line 5—5 in FIG. 2 showing the slag pot load as it is being returned from the dump position to the carry position by the return assist system.

For carrying the vehicle load and resiliently supporting it against shocks encountered as the vehicle travels over an uneven surface in accordance with another aspect of the invention, suspension cylinders 80 are provided upon each side of the vehicle, as may be seen in FIGS. 1 and 2.

Figure 13:
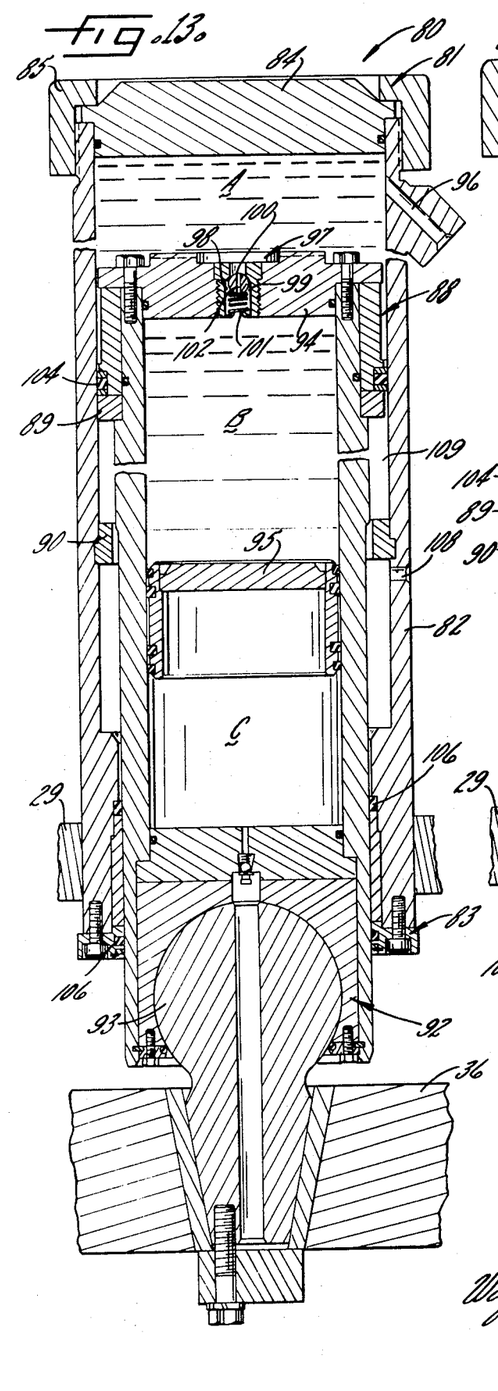
FIG. 13 is a sectional view taken substantially in the plane of line 13—13 in FIG. 3 showing in further detail the suspension cylinder portion of the invention as it appears in a partially extended position.
Figure 14:
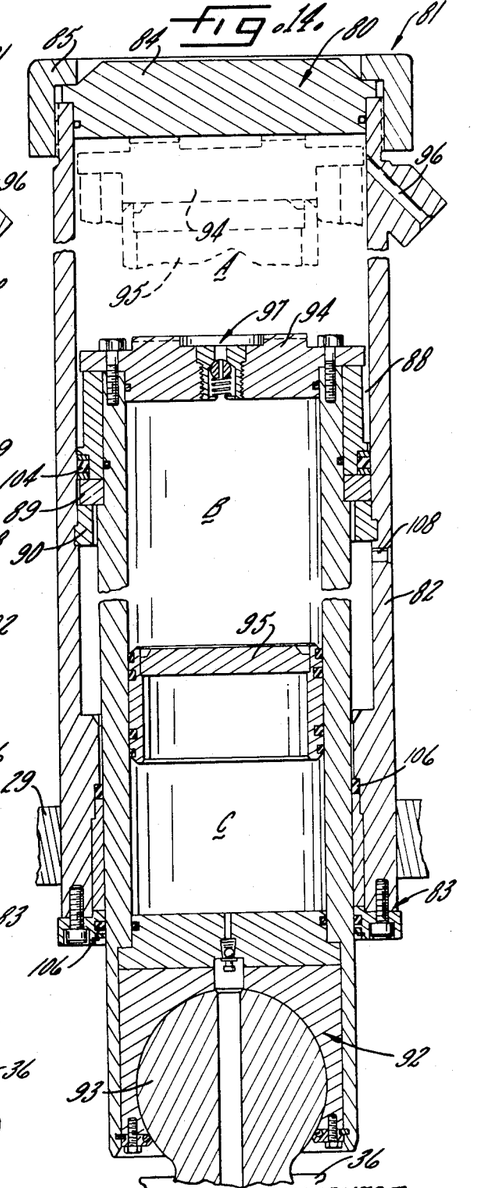
FIG. 14 is a sectional view taken substantially in the plane of line 14–14 in FIG. 1 and showing in further detail the suspension system of the invention as it appears in the most fully extended position.

In the illustrated embodiment particularly seen in FIGS. 13 and 14, the suspension cylinders 80 include a first or outer hollow cylinder 81 having a wall 82 open at one end 83 and closed, as by a cap 84 and threaded collar 85 at the opposite end. This outer cylinder 81 is secured by appropriate structure to the supported or suspended portions of the frame; in the embodied illustration, the frame arms 29 are attached to the outer cylinder 81.

Carried for sliding motion within the first cylinder 81 is a hollow second cylinder 88 closed at both ends. Between the first and second cylinders is thus created a first fluid chamber A. To limit the travel of the second cylinder 88 with respect to the first cylinder 81, an annular stop 89 is provided upon the outside of the second cylinder for engagement with annular stop 90 fixed upon the inside of the first cylinder 81.

Carried at the bottom closed end 92 of the second cylinder 88, is a ball joint 93 for connection to the trail arms 36 which are, in turn, directly connected to the wheel axles 35 and wheel sets 33. Thus, it will be seen that the ball joint 93 and closed end 92 of the second cylinder 88 respond to motion imparted to the wheel sets 33 by the travel of the vehicle over the ground surface, while the first cylinder 81 responds to the motion of the vehicle load and frame arms 29.

Carried within the second cylinder 88 is a floating piston 95 for dividing the interior of the second cylinder 88 into two additional fluid compartments B and C. Chambers A and B are filled with a relatively incompressible fluid, such as hydraulic fluid, as through an inlet port 96. The third chamber C is filled with a pre-determined static amount of relatively compressible fluid. Such fluid may take the form of compressed air or nitrogen in the illustrated embodiment.

To provide fluid communication between the first fluid compartment A and the second fluid compartment B, there is provided a damper valve 97.

This damper valve 97 is of such construction as to allow fluid to pass more rapidly from the first chamber A to the second chamber B than passes from the second chamber B to the first chamber A under identical absolute pressure differentials. When, in the illustrated embodiment, fluid pressure is raised in the first chamber relative to that in the second chamber, the bored ball 98 is forced away from its seat 99 in the damper valve, allowing a relatively large quantity of fluid to pass through the main passage 100 in the damper valve 97. Upon pressure equalization in the chambers, the biasing means 101 urges the bored ball 98 back into its seat 99. When the pressure is raised in the second chamber relative to the first, the bored ball 98 is simply forced more tightly against its seat, and a relatively small amount of fluid is allowed to pass to the small bore 102 within the bored ball 98. Other constructions of damper valves providing the described fluid flow may be used without departing from the broad spirit of the invention.

Operation of the suspension system may now be easily understood. When a shock is encountered by the traveling vehicle, the wheels and connected trail arms 36 are thrust upwardly toward the trailer frame 29. Such action on the part of the trail arms 36 forces the connected second cylinder further upwardly into the first cylinder, thereby decreasing the volume of the first fluid chamber A. This action forces the relatively incompressible fluid in the first chamber A rapidly into the second chamber B. The increase in volume of fluid within the second chamber B in turn forces the floating piston 95 relatively downward within the second cylinder 88 against the resilient action of the compressible fluid carried in the third chamber C.

After the bump or shock has been passed, the suspension system is returned to its former condition by the action of the now highly compressed resilient fluid in the third chamber C against the floating piston 95. This compressive action forces fluid from the second chamber back into the first chamber through the damper valve 97 at a relatively slow rate, thereby relatively slowly returning the system to its normal condition.

A seal 104 is provided to prevent the leakage of fluid in the first chamber into the annular space 105 formed between the first and second cylinders. To further prevent fluid leakage and exclude dirt or other foreign matter which might otherwise enter the mechanism, second seals 106 are provided at the lower end 83 of the first cylinder.

In accordance with another aspect of the invention, selective fluid power means are provided to positively retract the second cylinder 88 within the first cylinder 81. A port 108 communicates with the annular space 105 between the cylinder, and may be filled with pressurized fluid when desired. Pressure upon the cylinder stop 89 and seal 104 forces the second cylinder 88 to retract up into the first cylinder 81. As the volume of the first chamber A is thus decreased, fluid contained therein is expelled through the inlet port 96. This retraction system may prove highly useful. For changing vehicle tires, or performing maintenance on the wheel sets 33, the frame 27 may be blocked in its raised or carry position or otherwise rendered immobile, and the second cylinder then retracted. Such retraction raises the wheel support arm 36 and attached wheel set 33 from the ground. Alternatively, if the frame 27 is not blocked up or otherwise fixed, such relative retractive telescoping motion of the first and second cylinders will lower the frame through a limited vertical distance. The carried load may thus be set down and then released by the hook engagement mechanism 31; if special circumstances require, an unloaded trailer may also be positively lowered for engagement with a pot or other load which may be resting upon the ground. After engagement, the trailer frame is raised and the pot or load thus hoisted into the described carry position.

Figure 15:
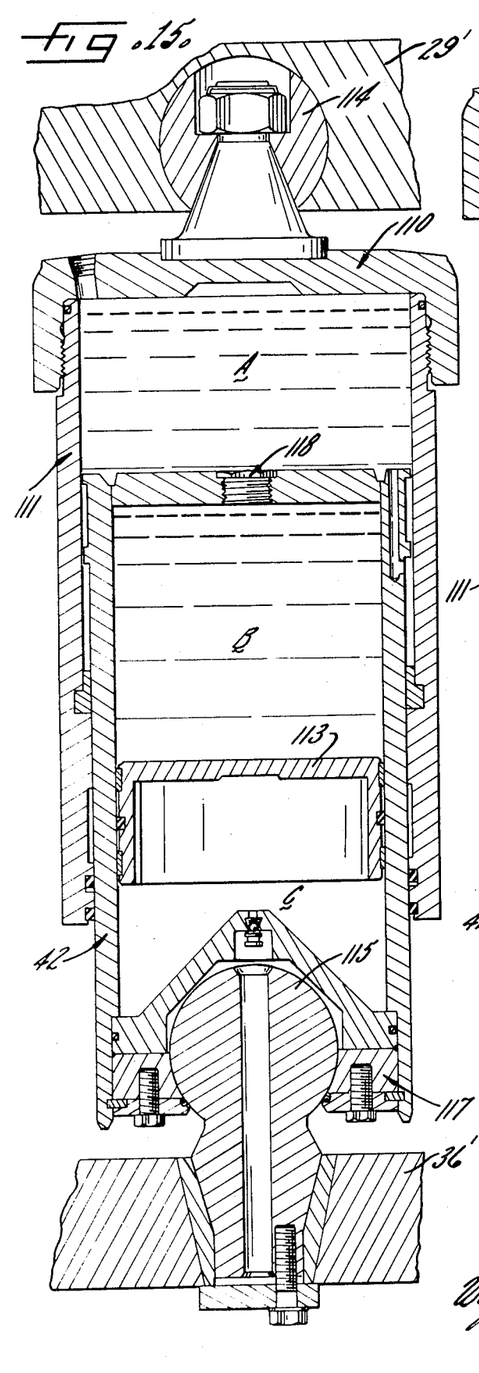
FIG. 15 is a sectional view taken substantially in the plane of line 13—13 in FIG. 3 showing a modified version of the suspension cylinder portion of the invention in a partially extended position.
Figure 16:
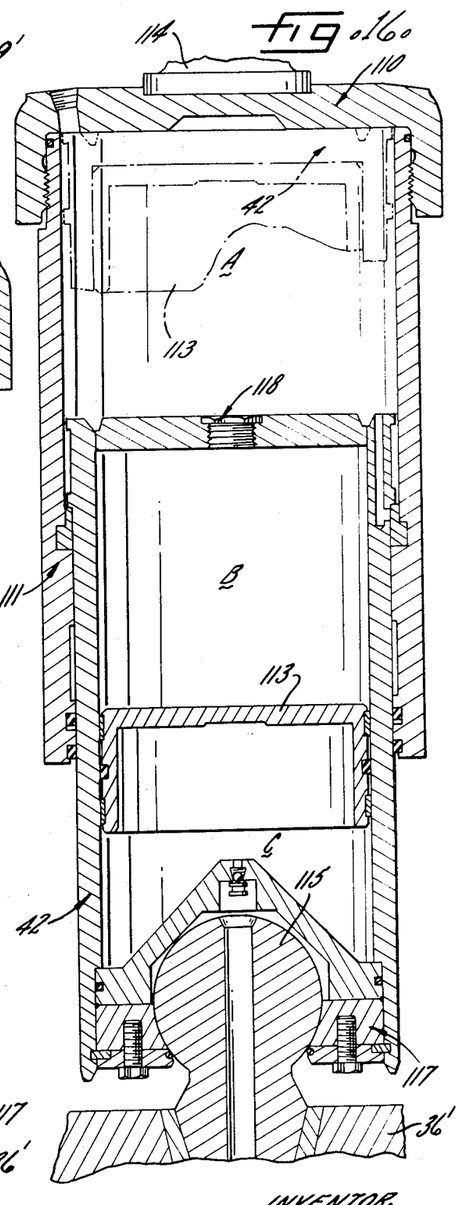
FIG. 16 is a sectional view taken substantially in the plane of line 14–14 in FIG. 1 showing the modified version of the suspension cylinder in the most fully extended position.

A modified form of the suspension cylinder 110 is shown in FIGS. 15 and 16. Such modified version may find especial application in applications where the distance between the wheel support structure and the vehicle frame is limited. In this modified version, a first or outer cylinder 111 carries within it a second cylinder 112, and a floating piston 113 is carried within the second cylinder. The top of the first cylinder is connected, as by a ball joint 114, to a vehicle frame, and the bottom or closed end of the second cylinder 112 is connected, as by ball joint 115, to the wheel-associated structure or trail arms 36. The closed end 117 of the second cylinder 112 is so shaped as to accommodate a portion of the length of the ball joint 115 within the cylinder itself, thereby decreasing the overall length of the suspension system. A damper valve 118 is located between the first and second fluid chambers for allowing passage of fluid from the first chamber to the second chamber more rapidly than passage of fluid from the first chamber to the second chamber under identical absolute pressure differentials.

Figure 17:
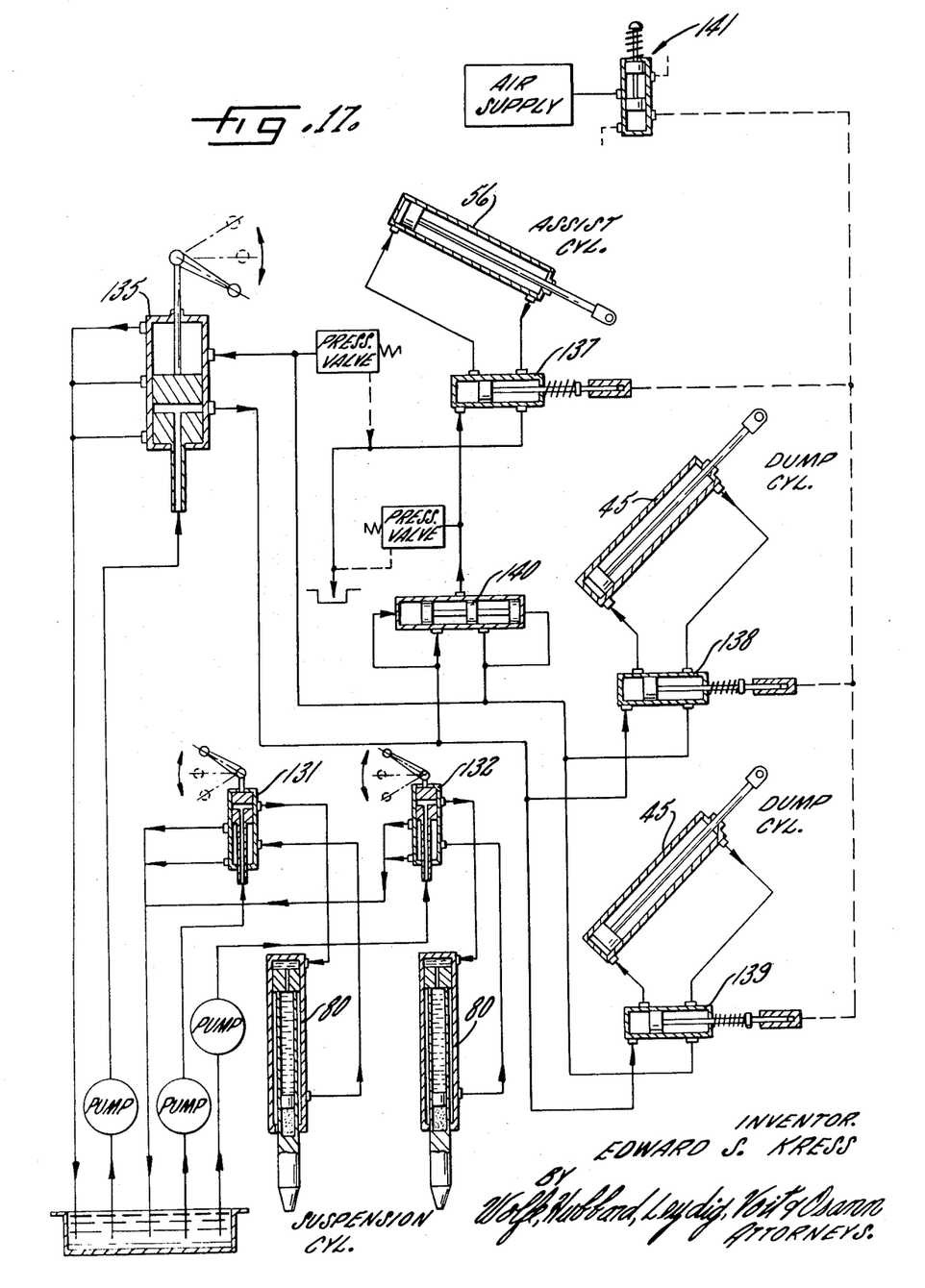
FIG. 17 is a schematic view illustrating the hydraulic system utilized in connection with the illustrated embodiment of the invention.

In accordance with another aspect of the invention, a single hydro-pneumatic system 130 is provided for operating the main dump cylinders 45, the assist means 50, and the trailer suspension cylinders 80. This system may take the form schematically illustrated in FIG. 17. Valves 131 and 132 are provided for individually controlling each of the suspension cylinders 80 to allow individual activation or draining of the cylinders 80. This individual erection allows one side of the trailer 24 to be raised higher than the other, thereby canting the trailer, if necessary, to properly engage a load such as a pot which may be resting on an uneven surface. Appropriate actuation of both cylinders 80 in tandem allows the load-engaging hook mechanism 31 to be lowered or raised through a limited range of positions, and also provides the described desirable suspension characteristics.

Fluid pressure for operating the primary dump cylinders 45 in tandem together with the assist power cylinder 56 to dump the carried load and return the vehicle load carrier or port to its carry position is selectively provided through a dump valve 135. Upon operation of the master valve 135 as shown, pressure is supplied through three fluid operated pneumatic knocker valves 137, 138 and 139 to extend the dump cylinder 45 and assist cylinder 56, and move the vehicle load carrier or pot from its carry toward its dump position. To retract the load or pot to its carry position, the dump valve 135 may be positioned in a retract position, whereupon the piston rods 47 of the dump cylinders 45 will be forcibly retracted and the assist cylinders are again extended to raise the load or pot through its top dead center position (see FIG. 7) and to its carry position. It is a feature of the invention that pressurized fluid is directed as described to the cylinders by a reversible valve 140.

In accordance with yet another feature of the invention, the load or pot may be relatively rapidly rotated or dropped from slightly beyond its top dead center position to its dump position. To this end, a drop valve 141 is connected to the knocker valves 137, 138 and 139 provided within the reach of the vehicle operator. When the load has moved slightly beyond its top dead center position, the drop valve may be actuated, and the knocker valves 137-139 shifted so as to allow the dump cylinders 45 and assist cylinder 56 to drain off fluid and the load to drop, by its own weight, against the pressure of the fluid draining from the cylinders. By alternately operating the load-retract valve and drop valve before the pot reaches its top dead center position in the retract cycle, the pot may be alternately raised and dropped. Such dropping jars the pot and deskulling it of slag or other material which may adhere thereto.

I claim as my invention:

1. A vehicle suspension device comprising, in combination, a pair of mutually telescoped cylinders having opposite ends adapted to receive and transmit vehicle loads therethrough, the inner one of said cylinders having a closed end in fluid sealing relation with the outer one of said cylinders, a floating piston disposed in said inner cylinder, means for charging said inner cylinder with compressible fluid so as to urge said piston toward said closed end, means for charging said outer cylinder with relatively incompressible fluid, and a damper valve in said closed end for allowing said incompressible fluid to move freely against said floating piston upon collapsing telescopic movement of the cylinders while restricting fluid flow through said end in the reverse direction.

2. The combination of claim 1 including means for selectively introducing fluid under pressure within said outer cylinder and beneath said closed end so as to cause collapsing telescopic movement of the cylinders.

* * * * *